W. H. PINNER.
Apparatus for Preventing the Escape of Gases from Soap Kettles, &c.
No. 59,260. Patented Oct. 30, 1866.
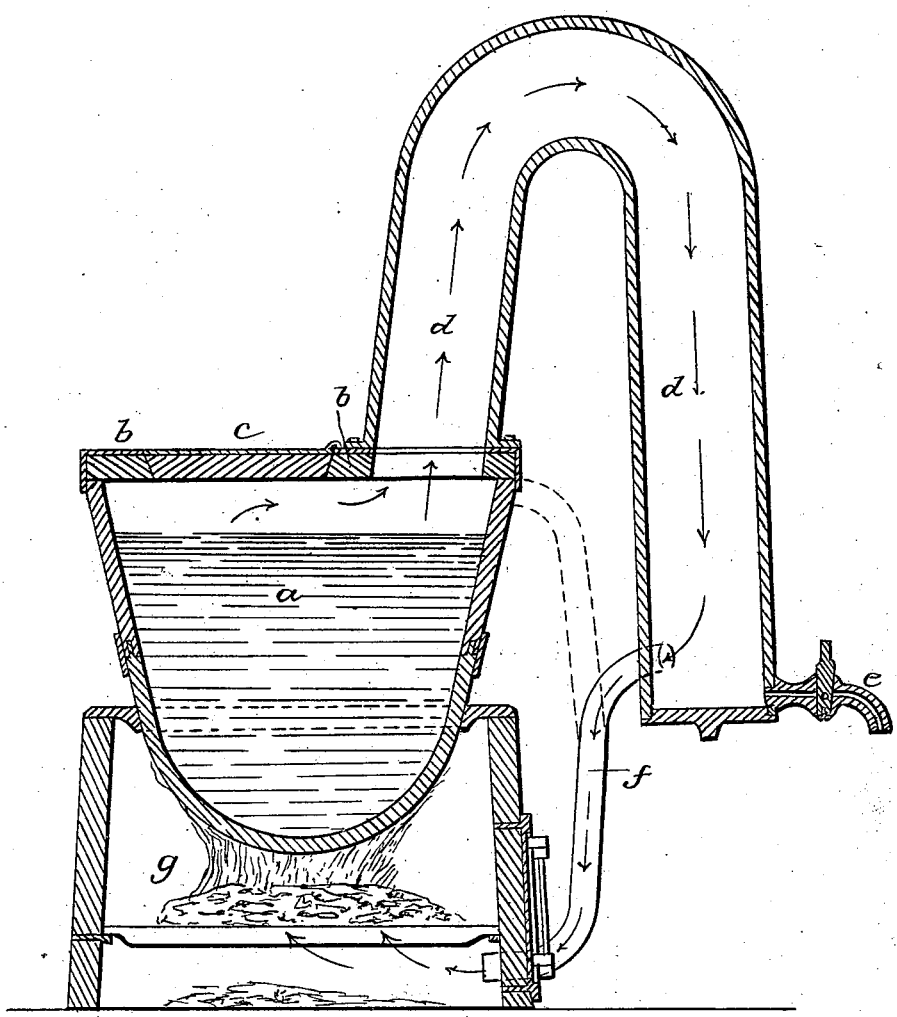

UNITED STATES PATENT OFFICE.

WILLIAM H. PINNER, OF NEW YORK, N. Y.

IMPROVED APPARATUS FOR PREVENTING THE ESCAPE OF GASES FROM SOAP-KETTLES AND RENDERING APPARATUS, &c.

Specification forming part of Letters Patent No. 59,260, dated October 30, 1866.

*To all whom it may concern:*

Be it known that I, WILLIAM H. PINNER, of the city and State of New York, have invented, made, and applied to use a certain new and useful Improvement in Apparatus for Preventing the Escape of Vapors from the Boiling of Fats, Soaps, &c.; and I do hereby declare the following to be a full, clear, and exact description of the said invention, reference being had to the annexed drawing, making part of this specification, wherein I have represented a vertical section of the said improvement as applied to an ordinary soap-kettle.

The steam arising during the boiling of soaps and the trying out and the purifying of fats, oils, &c., conveys away many offensive and in some cases noxious vapors, which would be disseminated but little were it not for the escape of said steam.

Efforts have been made to burn up these vapors; but the amount of steam passing off with them has tended to dampen the fire and check its combustion.

The nature of my said invention consists in a condensing-vessel, applied between the kettle and the escape to the fire in such a manner that the watery particles, or a large portion of them, are condensed and pass away in the form of water, or are returned to the boiler, while the noxious or disagreeable fumes or vapors pass into the fire and are consumed.

In the annexed drawing, $a$ represents the boiler, of any usual construction, with a cover, $b$, which sets over the said boiler, and is made moderately tight; and $c$ is a trap-door or manhole for the introduction and removal of fat, soap, or other material.

$d$ is a large tube or casing rising from the cover $b$ to any desired height, or it may be formed with an elbow or bend, as shown, and descend at the side of the pan or boiler. This tube $d$ is to be of sufficient size to cause the condensation of the whole or a large portion of the steam, which passes off during the boiling operation; and in warm weather, if the tube does not sufficiently condense the vapors by the action of the atmosphere, a small stream of water may be allowed to run over it.

Where the pipe $d$ stands vertically above the kettle or boiler $a$ the water of condensation will run back into said boiler; but where an elbow or bend is employed, as shown, provision must be made for drawing off the water by a cock or other device, as at $e$.

From the tube $d$ a vapor-pipe, $f$, passes into the furnace $g$, or said vapor-pipe may pass out of the side of the kettle $a$, as shown by dotted lines, or both may be used.

The effect of this apparatus is to draw down and consume in the fire all the offensive vapors that are not condensed, and the action of the fire producing an inward current into the apparatus prevents the escape of noxious and disagreeable vapors, even when the trap $c$ may be open, or in case the cover to the pan is not tight.

What I claim, and desire to secure by Letters Patent, is—

The condensing-tube $d$ and vapor-tube $f$, in combination with the kettle and furnace for boiling fats, soaps, or other similar substances, for the purposes and as specified.

In witness whereof I have hereunto set my signature this 21st day of June, A. D. 1866.

W. H. PINNER.

Witnesses:
 LEMUEL W. SERRELL,
 GEO. D. WALKER.